United States Patent [19]

Yamaguchi

[11] Patent Number: 4,644,319

[45] Date of Patent: Feb. 17, 1987

[54] ADDRESSER DESIGNATION CHARACTER PATTERN GENERATION APPARATUS FOR FACSIMILE TRANSMISSION

[75] Inventor: Shingo Yamaguchi, Tokyo, Japan

[73] Assignee: Ricoh Company, Ltd., Tokyo, Japan

[21] Appl. No.: 185,062

[22] Filed: Sep. 8, 1980

[30] Foreign Application Priority Data

Sep. 17, 1979 [JP] Japan .................................. 54-118000
Oct. 8, 1979 [JP] Japan .................................. 54-128904

[51] Int. Cl.$^4$ ............................................. G09G 1/00
[52] U.S. Cl. .................................... 340/731; 340/749; 340/728
[58] Field of Search ............... 340/731, 728, 749, 750, 340/748, 717; 178/30, 15

[56] References Cited

U.S. PATENT DOCUMENTS

| | | | |
|---|---|---|---|
| 3,641,559 | 2/1972 | Hogan et al. | 340/717 |
| 4,090,188 | 5/1978 | Suga | 340/731 |
| 4,107,786 | 8/1978 | Masaki et al. | 340/749 |
| 4,129,860 | 12/1978 | Yonezawa et al. | 340/731 |

Primary Examiner—Marshall M. Curtis
Attorney, Agent, or Firm—David G. Alexander

[57] ABSTRACT

Scan lines of characters designating the name and address of a facsimile transmitting station or the like are stored in a read only memory (54). The scan lines are read out of the memory (54) and transmitted by a microcomputer (41) prior to facsimile transmission for reproduction on the top of a sheet of facsimile reproduction at a facsimile receiving station.

5 Claims, 18 Drawing Figures

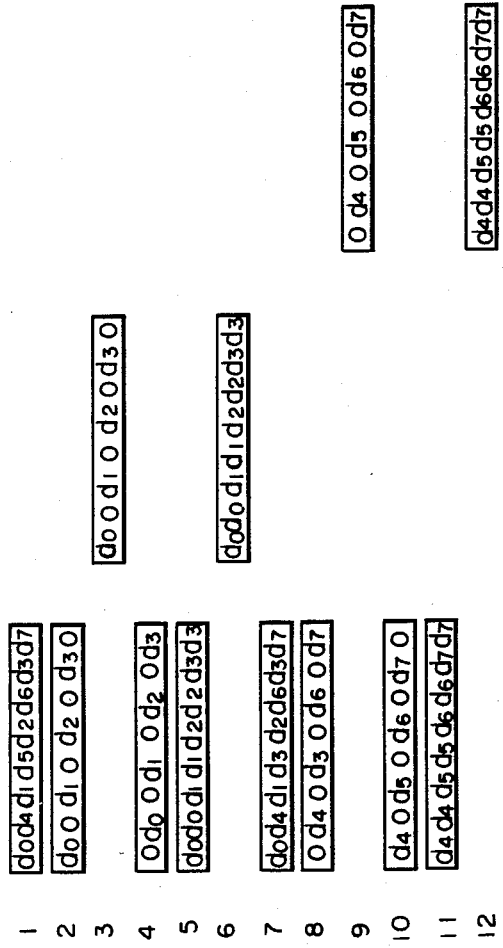

| ROMB CODE | LINE CODE | CHARACTER CODE | COLUMN | | | | | | | |
|---|---|---|---|---|---|---|---|---|---|---|
| A15 A14 A13 A12 A11 | A10 A9 A8 A7 | A6 A5 A4 A3 A2 A1 A0 | 0 | 1 | 2 | 3 | 4 | 5 | 6 | 7 |
| 1 0 0 0 0 | 0 0 0 0 | 0 0 0 0 0 0 0 | 1 | 1 | 1 | 1 | 1 | 1 | 1 | 0 |
| ⋮ | ⋮ | ⋮ | ⋮ | | | | | | | |
| 1 0 0 0 0 | 0 0 0 0 | 1 0 0 0 0 0 0 | 0 | 0 | 1 | 1 | 1 | 1 | 0 | 0 |
| 1 0 0 0 0 | 0 0 0 0 | 1 0 0 0 0 0 1 | 0 | 0 | 1 | 1 | 1 | 0 | 0 | 0 |
| 1 0 0 0 0 | 0 0 0 0 | 1 0 0 0 0 1 0 | 1 | 1 | 1 | 1 | 1 | 1 | 0 | 0 |
|  |  |  | 0 | 1 | 0 | 0 | 0 | 1 | 0 | 0 |
| 1 0 0 0 0 | 0 0 0 1 | 0 0 0 0 0 0 0 | 1 | 0 | 0 | 0 | 0 | 0 | 1 | 0 |
| ⋮ | ⋮ | ⋮ | ⋮ | | | | | | | |
| 1 0 0 0 0 | 0 0 0 1 | 1 0 0 0 0 0 0 | 0 | 1 | 0 | 0 | 0 | 0 | 1 | 0 |
| 1 0 0 0 0 | 0 0 0 1 | 1 0 0 0 0 0 1 | 0 | 1 | 0 | 0 | 0 | 1 | 0 | 0 |
| 1 0 0 0 0 | 0 0 0 1 | 1 0 0 0 0 1 0 | 0 | 1 | 0 | 0 | 0 | 0 | 1 | 0 |
| ⋮ | ⋮ | ⋮ | ⋮ | | | | | | | |
| 1 0 0 0 0 | 0 0 1 0 | 0 0 0 0 0 0 0 | 1 | 0 | 0 | 0 | 0 | 0 | 1 | 0 |
| ⋮ | ⋮ | ⋮ | ⋮ | | | | | | | |
| 1 0 0 0 0 | 0 0 1 0 | 1 0 0 0 0 0 0 | 1 | 0 | 0 | 1 | 1 | 0 | 1 | 0 |
| 1 0 0 0 0 | 0 0 1 0 | 1 0 0 0 0 0 1 | 1 | 0 | 0 | 0 | 0 | 0 | 1 | 0 |
| 1 0 0 0 0 | 0 0 1 0 | 1 0 0 0 0 1 0 | 0 | 1 | 0 | 0 | 0 | 0 | 1 | 0 |

ROMC brace spans ROMB CODE, LINE CODE, CHARACTER CODE. ROMB brace spans COLUMN.

D₀, D₁, D₂ labels mark the three rows with character codes 1000000, 1000001, 1000010 in the first block.

ADDRESSER DESIGNATION CHARACTER PATTERN GENERATION APPARATUS FOR FACSIMILE TRANSMISSION

BACKGROUND OF THE INVENTION

The present invention relates to a character video signal generation system and, more particularly, to a character video signal generation system which produces character patterns suitable for facsimile communication or the like as bit-by-bit video signals.

In a facsimile communication system for example, the transmitter or addresser's name, telephone number and other information for station identification which are absent on original documents must be reproduced at the receiver or addressee's station in addition to patterns on the original documents. This is to facilitate filing and management of recording sheets at the addressee's station.

Conventionally, a facsimile communication system has employed an additional information transmitting device located at the addresser's station and an additional information receiving device at the addressee's station, each being separate from the transceiver. With these additional devices, the addresser transmits additional information in code while the addressee transforms the code into data which can be recorded on a paper sheet.

This not only renders the facsimile system intricate but creates a drawback in that, due to the transmission of coded data, an error in transmission prevents the transmitted data from being reproduced accurately at the addressee's station.

A character video signal generation system has been proposed which includes a line counter for indicating a line position in the vertical scan direction, a column counter for indicating a column position in the horizontal scan direction, a character counter for indicating the horizontal scan direction on a one character basis and a character generator adapted to generate one character of a picture element pattern. The character generator generates a picture element pattern indicative of a given character in response to the count of the character counter. This picture element pattern is subjected to line-scan decomposition according to the counts of the line and column counters and thereby transformed into bit-by-bit video signals.

This permits information absent on original documents to be exchanged through existing facsimile devices and, therefore, makes the system construction simple. Since information is transmitted as decomposed picture elements, the redundancy is such that the addressee can obtain accurate information despite any slight error in the transmission. The system is thus quite convenient in reproducing such identification data at the addressee's station for facsimile communication.

Such advantages are further enhanced with the construction of the present invention.

SUMMARY OF THE INVENTION

A video pattern generation apparatus embodying the present invention comprises memory means for storing data bits corresponding to scan lines of characters, computing means for reading the data bits out of the memory means, and transmission means for transmitting each consecutive data bit a plurality of times.

In accordance with the present invention, scan lines of characters designating the name and address of a facsimile transmitting station or the like are stored in a read only memory. The scan lines are read out of the memory and transmitted by a microcomputer prior to facsimile transmission for reproduction on the top of a sheet of facsimile reproduction at a facsimile receiving station.

It is an object of the present invention to provide an improved character pattern generation apparatus of simplified construction which can be manufactured at low cost on a commercial production basis.

It is another object of the present invention to provide a generally improved video pattern generation apparatus.

Other objects, together with the foregoing, are attained in the embodiments described in the following description and illustrated in the accompanying drawing.

BRIEF DESCRIPTION OF THE DRAWING

FIG. 2 shows a character pattern exemplifying a character to be generated;

FIG. 3 shows a character pattern recorded in magnified size on a paper sheet;

FIG. 6 shows a character pattern recorded in a memory when a character is to be doubled in size according to another embodiment of the present invention;

FIG. 7 shows transition of data in various registers to represent the operation of another embodiment of the invention for magnifying a character two times;

FIG. 8 shows a character pattern which will be stored in a memory for magnifying a character three times according to still another embodiment of the invention;

FIGS. 9(a)-9(c) show transition of data in various registers demonstrating the operation of a further embodiment of the invention for magnifying a character three times;

FIG. 9(d) shows picture element data arranged in a memory as a result of the operation depicted in FIGS. 9(a)-9(c);

FIG. 12 shows data stored in a memory for generating the picture element patterns;

DESCRIPTION OF THE PREFERRED EMBODIMENTS

While the video pattern generation apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
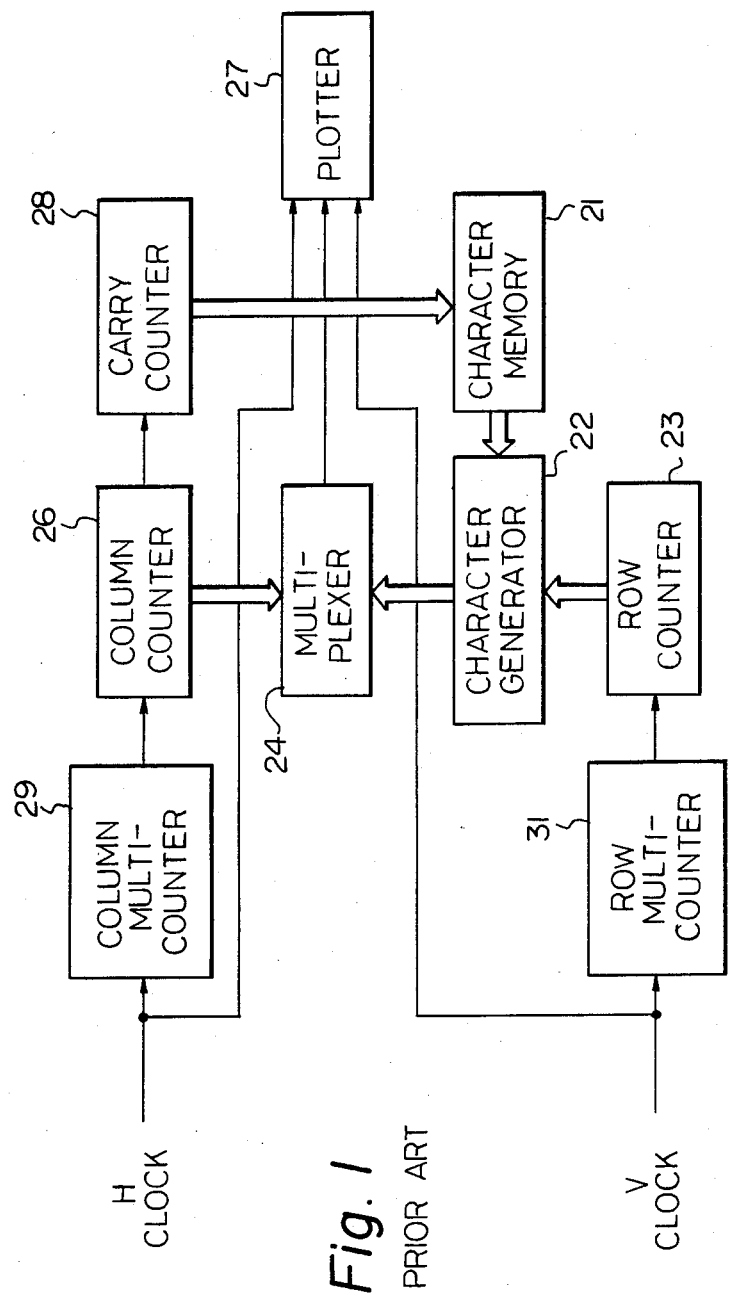
FIG. 1 is a block diagram showing a prior art character pattern generator.
Figures 2, 3:
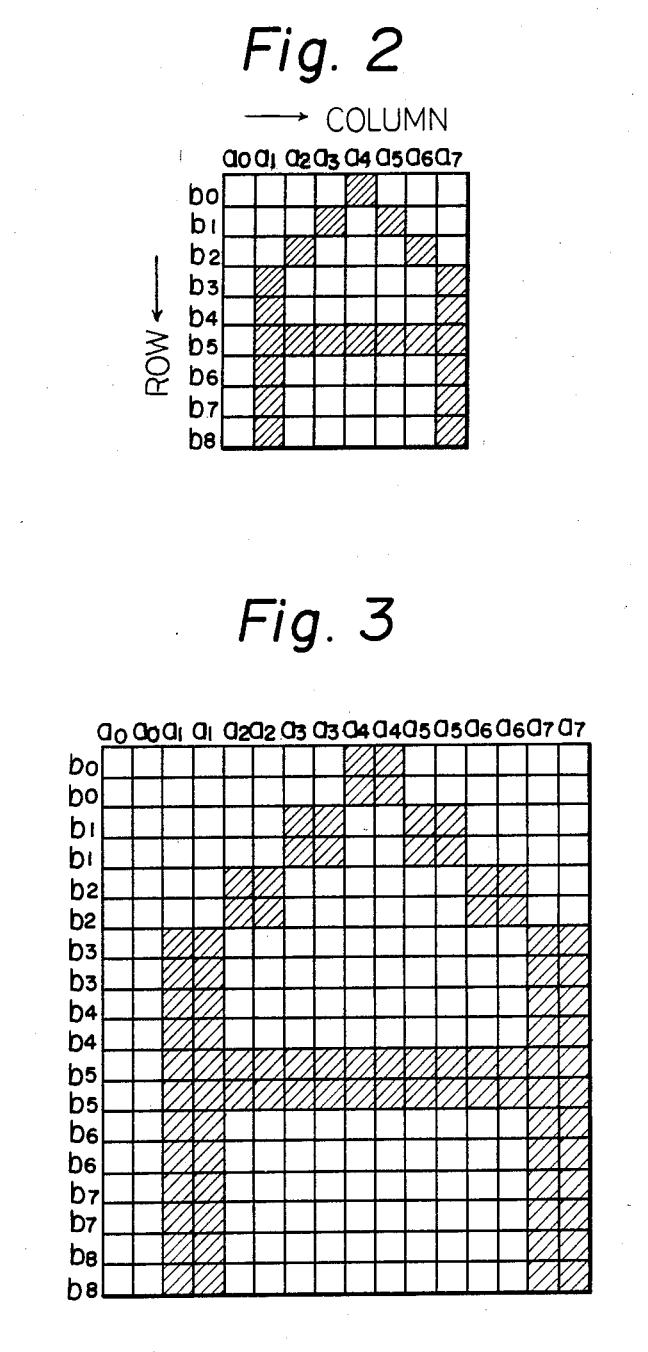

Referring to FIG. 1, a prior art character pattern generator includes a character memory 21 which has stored therein character patterns in consecutive memory locations or addresses as codes. A character generator 22 receives output codes from the character memory 21 and generates a character pattern which may consist of eight columns and nine rows of picture elements as shown in FIG. 2. A row counter 23 successively designates the row addresses of the picture element pattern in the character generator 22 so that eight columns of picture element data of each row are delivered to a multiplexer 24. A column counter 26 designates the column addresses of the 8-column picture element data at the multiplexer 24 thereby feeding the data bit-by-bit to a unit 27 which is a plotter or recording unit at the addressee's station or a data compressing unit at the addresser's station as the case may be. A carry counter 28 successively designates the addresses of the character memory 21 while counting carry outputs of the column counter 26. Horizontal scan clock pulses a are supplied to and divided by a column multicounter 29 adapted to determine the magnification of the desired character pattern in the horizontal scan direction. Likewise, vertical scan clock pulses b are divided by a row multicounter 31 which serves to determine the magnification in the vertical scan direction. Where it is desired to double the size of a character pattern for instance, the counters 29 and 31 will be individually set to double their input frequencies.

Suppose that a character code read from the character memory 21 according to the count of the carry counter 28 has caused the character generator 22 to generate a character pattern "A" as viewed in FIG. 2. Also suppose that the counters 29 and 31 have been so set as to double the input frequencies while the counts of the counters 23 and 26 are commonly "0".

Then 8 columns of picture element data corresponding to row "0" designated by the row counter 23 are supplied from the character generator 22 to the multiplexer 24. The column counter 26 successively designates the picture element data so that the picture element data for column "0" are fed bit-by-bit to the recording unit 27.

The counts of the column and row counters 26 and 23 are altered every time two horizontal scan clock pulses a and two vertical scan clock pulses b appear, respectively. The recording unit 27 on the other hand feeds a paper sheet vertically in response to every vertical scan pulse b and records in every horizontal scan position the picture element data supplied thereto from the multiplexer 24 in synchronism with the horizontal scan clock pulses a. As a result, the character pattern generated by the character generator 22 is reproduced on the paper sheet and doubled in size both horizontally and vertically as shown in FIG. 3.

This type of conventional character pattern generator is conveniently usable for facsimile communication to generate characters which are not printed on original documents. A drawback still resides, however, in that the character pattern generator needs such a large number of components including various counters, character generator and multiplexer that it is complex, expensive and bulky.

Figure 4:
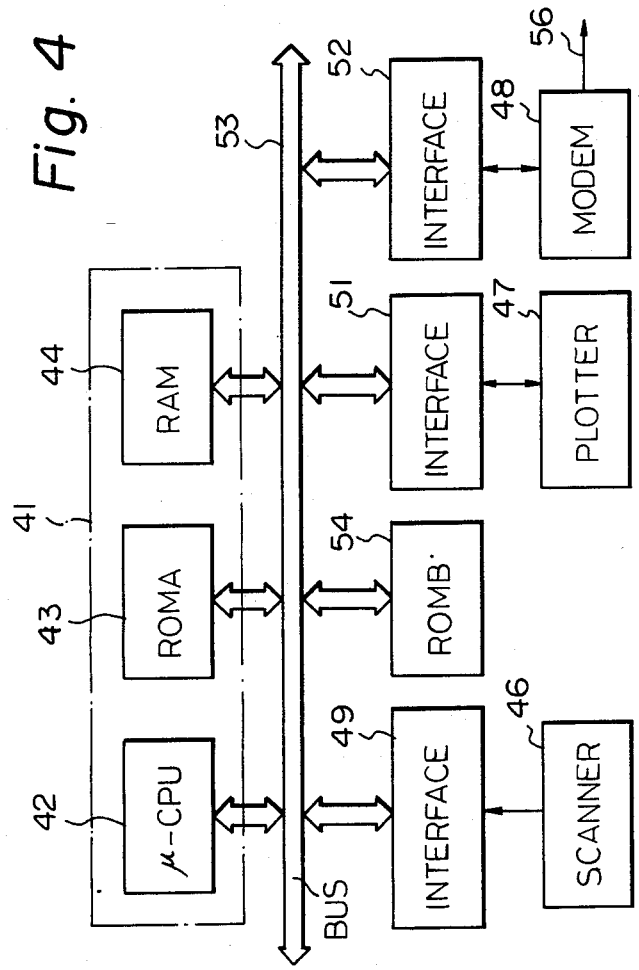
FIG. 4 shows in block diagram a facsimile device to which the present invention is applicable.

Referring now to FIG. 4, there is shown an exemplary facsimile transceiver to which the present invention is applicable. The device includes a microcomputer 41 comprising a microprocessor or μ-CPU 42, read only memory or ROMA 43, random access memory or RAM 44, scanner 46, plotter or printer 47 and modem 48. The units 46, 47 and 48 are connected through individual interfaces 49, 51 and 52 to a bus BUS 53 of the microcomputer 41.

According to this embodiment, the facsimile transceiver is additionally provided with a read only memory or ROMB 54 which is connected with the BUS 53 and adapted to successively store picture element data of character patterns to be generated in predetermined addresses as will be described. Naturally, this additional read only memory ROMB 54 is omissible and the picture element data may be stored in the read only memory ROMA 43 as long as the storage capacity of the latter is sufficient.

The read only memory ROMB 54 stores one line of 8 columns or 8 bits of picture element data corresponding to row or line "0" of each character pattern in its individual addresses. Picture element data corresponding to line "1" are stored in the next consecutive address and onward. In this manner, picture element data are stored in the read only memory ROMB 54 up to line "9".

Usually, the microprocessor μ-CPU 41 executes program stored in the ROMA 43. In a transmission mode, the microprocessor 42 picks up picture information read by the scanner 46 by 8 parallel bits through the scanner interface 49 and stores them in the random access memory RAM 44. After one scan line of data has been read, the microprocessor 42 compresses and feeds it to a transmission line 56 through the modem interface 52 and modem 48 for modulation. In a reception mode, the microprocessor 42 stores in the random access memory RAM 44 data demodulated by the modem 48 through the modem interface 52 and, after reproducing the data, feeds it to the printer 47 via the printer interface 51 to record it on a paper sheet.

The printer 47, in the case of the electrostatic type or the thermal type, has a number of electrodes arranged over the horizontal scanning width and records one line of data as one horizontal scan line and records the next scan line of data after a vertical feed of the paper sheet.

When it is desired to record characters which are absent on an original document on a paper sheet, the microprocessor μ-CPU 42 based on a program stored in the read only memory ROMA 43 reads out picture element data successively from predetermined addresses of the read only memory ROMB 54 and passes them through the printer interface 51 to the printer 47. The printer 47 thus receives one line of picture element data for each character to be generated. Recording of these data will reproduce the characters stored in the read only memory B 54 on the paper sheet.

The recording bit area of the read only memory ROMB 54 is so small that recording a character stored in the read only memory B 54 directly on a paper sheet will result in a very small character. Supposing that the dot spacing is $\frac{1}{8}$ mm and that one character consists of 7×9 dots, the available width of a character is not more than $\frac{7}{8}$ mm or, if the intercharacter spacing is one dot, 1 mm at the maximum.

Therefore, the picture element data produced from the read only memory B 54 must be enlarged to a given magnification before being reproduced on a paper sheet.

The illustrated embodiment readily promotes recording of characters at such magnification.

Figure 5:
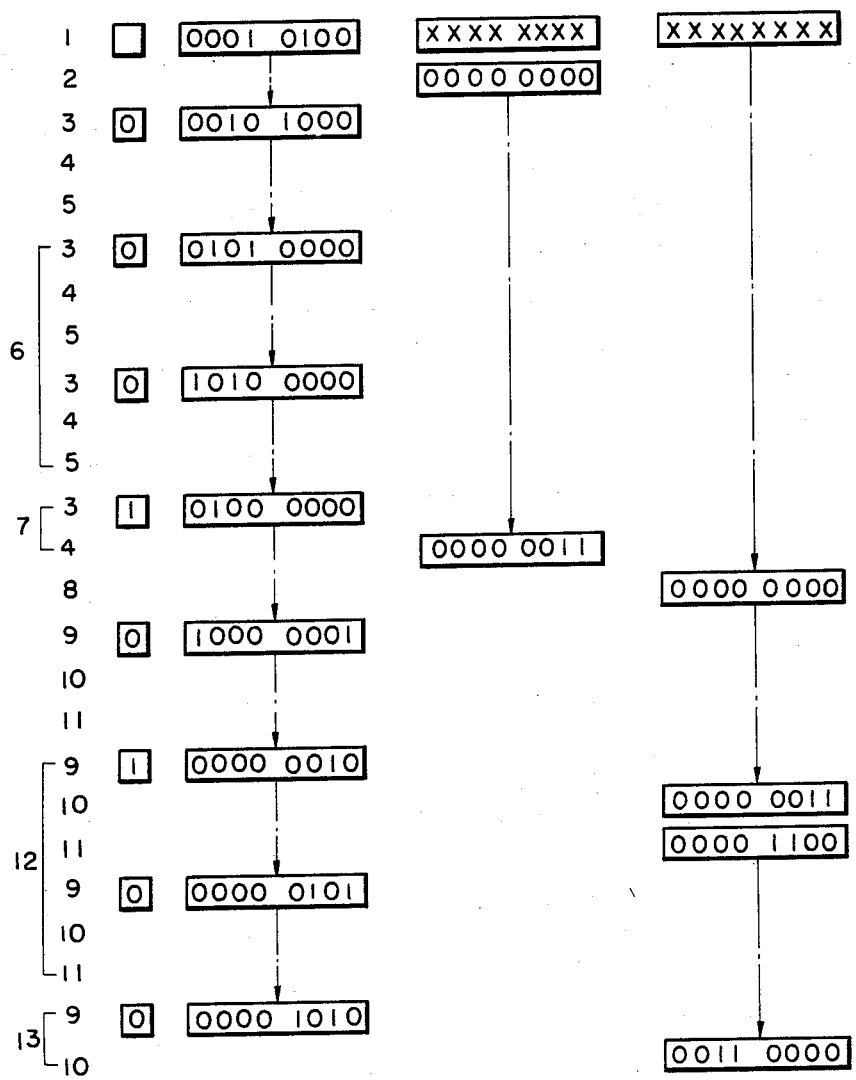
FIG. 5 shows transition of data in various registers to demonstrate the operation of one embodiment of the present invention.

This will be discussed with reference to FIG. 5 taking for example a case wherein the picture element data "00010100" on $b_1$ row of FIG. 2 are to be magnified two times. In FIGS. 5, 7 and 9a to 9d the step numbers correspond to the parenthetical numbers in the corresponding portions of the specification.

FIG. 5 illustrates transition of picture element data stored sequentially in registers A, B and C of the microprocessor μ-CPU 42 in accordance with the progress of the program. The microprocessor 42 executes program steps stored in the read only memory A 43 as follows.

(1) Picture element data "00010100" are read out from a predetermined address of the read only memory ROMB 54 and loaded in the register A. The other registers B and C are irrelevant.

(2) The register B is cleared to "00000000".

(3) The register A is shifted one bit to the left.

(4) If the register A produces a carry, "11" is added to the register B. If not, this will not occur.

More specifically, the data stored in the register A are checked in step (3) as to whether they are "1" or "0" bit-by-bit. To magnify the character two times, "11" is set in the lower two bits of the register B if the carry is "1" and "00" if the carry is "0". This implies that "n" "1's" or "0's" will be set when the intended magnifications is "n".

In the illustrated case, the carry is "0" as shown in FIG. 5 requiring addition of "00" to the lower two bits of the register B. However, no actions are needed because the data in the register B is "00000000" from the start.

(5) Data in the register B are shifted two bits to the left. This is to get the register B ready to accommodate the next two bits of data in its lower two bits. The data will be shifted "n" bits to the left when the intended enlargement is by "n".

(6) The steps (3)–(5) are repeated two times thereafter.

(7) The steps (3) and (4) are repeated once.

The steps (3) and (4) have thus been repeated four times. This is because, due to the 8-bit construction of the register B, the steps (3) and (4) if repeated four times cause picture element data just twice enlarged to be stored in the register B.

Thus, at the end of the step (7), the register B has stored a twice enlarged version of the upper four bits of the picture element data "00010100".

(8) The register C is cleared.

(9) Data in the register A are shifted one bit to the left.

(10) If the register A produces a carry, "11" is set in the register C but, if not, then no actions take place.

(11) The register C is shifted two bits to the left.

(12) The steps (9) and (11) are repeated two more times.

(13) The steps (9) and (10) are repeated once.

The actions in the steps (8)–(13) are exactly the same as those in the steps (2)–(7) except for the replacement of the register B by the register C. Consequently, the lower four bits of picture element data are now stored in the register C as a twice enlarged version.

The registers B and C now have twice enlarged one character of picture element data therein. When these data are delivered to the printer 47 through the printer interface 51, the printer 47 will record a character which has been twice enlarged in the horizontal scan direction.

In this way, characters are enlarged twice line by line and coupled to and recorded by the printer 47 successively. After one line of recording, the system starts recording another line of data. In the meantime, the paper sheet will naturally be fed vertically after recording of one scan line. It will readily occur to those who are skilled in the art that a character can be enlarged in the vertical scan direction merely by supplying the printer 47 repeatedly with the same line of picture element data.

A system for generating a desired size character pattern using a microcomputer is not limited to the above-described system but may be replaced by another.

Figures 6, 8:
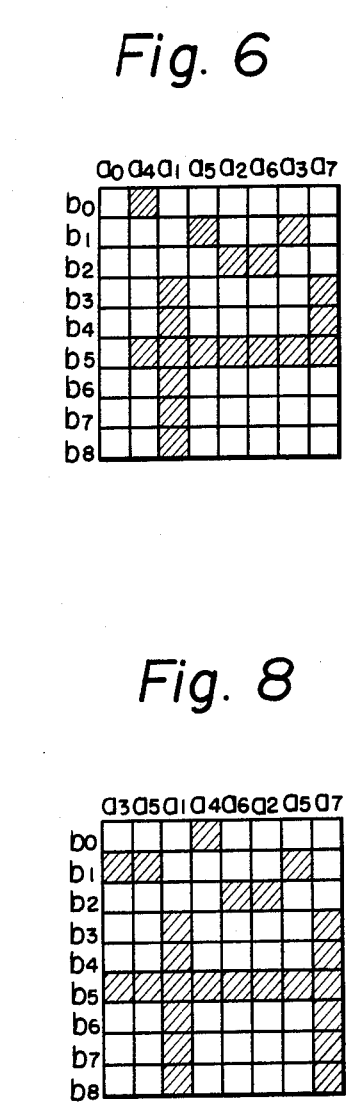

Reference will now be made to FIGS. 6 and 7 to describe another embodiment of the present invention.

To magnify the character twice, the columns $a_0$–$a_7$ in FIG. 2 are re-arranged on an alternating basis as indicated in FIG. 6 and stored in the read only memory ROMB 54. Then the following program steps stored in the read only memory ROMA 43 are carried out.

(1) Picture element data "00010010" of line 1 (represented by "$d_0d_4d_1d_5d_2d_6d_3d_7$" hereinafter) are read out from a predetermined address of the read only memory ROMB 54 and set in the register A.

(2) The logical product of "10101010" and register A is obtained such that the picture element data $d_0$–$d_3$ of columns $a_0$–$a_3$ solely remain and are again stored in the register A.

(3) The result is also stored in the register B.

(4) The register A is shifted one bit to the right.

(5) The logical sum of the registers A and B is stored in the register A.

(6) The result is stored in the register B.

(7) Picture element data are again read out from the read only memory ROMB 54 and loaded in the register A.

(8) The logical product of "01010101" and register A is obtained such that only the picture element data $d_4$–$d_7$ of the columns $a_4$–$a_7$ remain and are loaded in the register A.

(9) The result is stored in the register C.

(10) The register A is shifted one bit to the left.

(11) The logical sum of the registers A and C is stored in the register A.

(12) The result is stored in the register C.

Performing the programs steps described above, the registers A, B and C in the microprocessor 42 store the picture element data shown in FIG. 7 successively in correspondence with successive steps. Finally, the registers B and C store one line of picture element data in the character pattern of FIG. 2 as a horizontally twice enlarged version as in the first embodiment.

It will be apparent from the foregoing that a block of picture element data can be readily twice enlarged by reading out every other bit of data from a register and obtaining the logical sum of said data and data produced by shifting said data one bit to the right or to the left. In a more general sense, "n-th" enlarged picture element data are easily obtainable by reading every n-1th bit of data, shifting the data successively to the right or to the left and processing them to produce the logical sum.

To magnify a character three times for example, the columns $a_1$–$a_7$ of the character pattern shown in FIG. 2 are re-arranged as viewed in FIG. 8 and stored in the read only memory B 54. Since the column $a_0$ is a column only for a spacing and has no direct connection with actual generation of a character pattern, the columns $a_1$–$a_7$ alone are re-arranged as shown at two bit alternating spacing while omitting the column $a_0$. Then the microprocessor 42 carries out the following program steps stored in the read only memory ROMA 43.

(1) Picture element data "$d_3d_5d_1d_4d_6d_2d_5d_7$" are read out from a predetermined address of the read only memory ROMB 54 and loaded in the register A.

(2) The logical sum of "00100100" and register A is taken such that only the picture element data $d_1$ and $d_2$ of the columns $a_1$ and $a_2$ remain and are then stored in the register A.

(3) The result is also stored in the register B.

(4) The data in the register A are shifted one bit to the right.

(5) The logical sum of the registers A and B is obtained and stored in the register A.

(6) The result is stored in the register B.

(7) The data in the register A are shifted one bit to the right.

(8) The logical sum of the registers A and B is stored in the register A.

(9) The data in the register A are stored in a selected address $B_1$ of the random access memory RAM 44.

As a result of these program steps, three times enlarged bits of the picture element data $d_1$ and $d_2$ are first stored in the address $B_1$ of the random access memory RAM 44. This is followed by other program steps discussed below.

(10) As in step (1), picture element data "$d_3d_5d_1d_4d_6d_2d_5d_7$" are stored in the register A.

(11) The logical sum of the data "10010010" and data in the register A is stored in the register A.

(12) The result is stored in the register B.

(13) The data in the register A are shifted one bit to the right.

(14) The logical sum of the registers A and B is stored in the register A.

(15) The result is stored in the register B.

(16) The data in the register A are shifted one bit to the right.

(17) The logical sum of the registers A and B is stored in the register A.

(18) The content of the register A is stored in another selected address $B_2$ of the random access memory RAM 44.

By the program steps stated above, three times enlarged picture element data $d_3$ and $d_4$ are stored in the address $B_2$ of the random access memory RAM 44 by three bits each while the picture element data $d_5$ is stored in the same address by two bits each as shown in FIG. 9(b). Finally, the following program is executed.

(19) Picture element data "$d_3d_5d_1d_4d_6d_2d_5d_7$" are stored in the register A as in the step (1).

(20) The logical product of "01001001" and register A is stored in the register A.

(21) The result is stored in the register B.

(22) The data in the register A are shifted one bit to the left.

(23) The logical sum of the registers A and B is stored in the register A.

(24) The result is stored in the register B.

(25) The data in the register A are shifted one bit to the left.

(26) The logical sum of the registers A and B is stored in the register A.

(27) The data in the register A are shifted one bit to the left.

(28) The content of the register A is stored in a given address $B_3$ of the random access memory RAM 44.

Figure 9A:
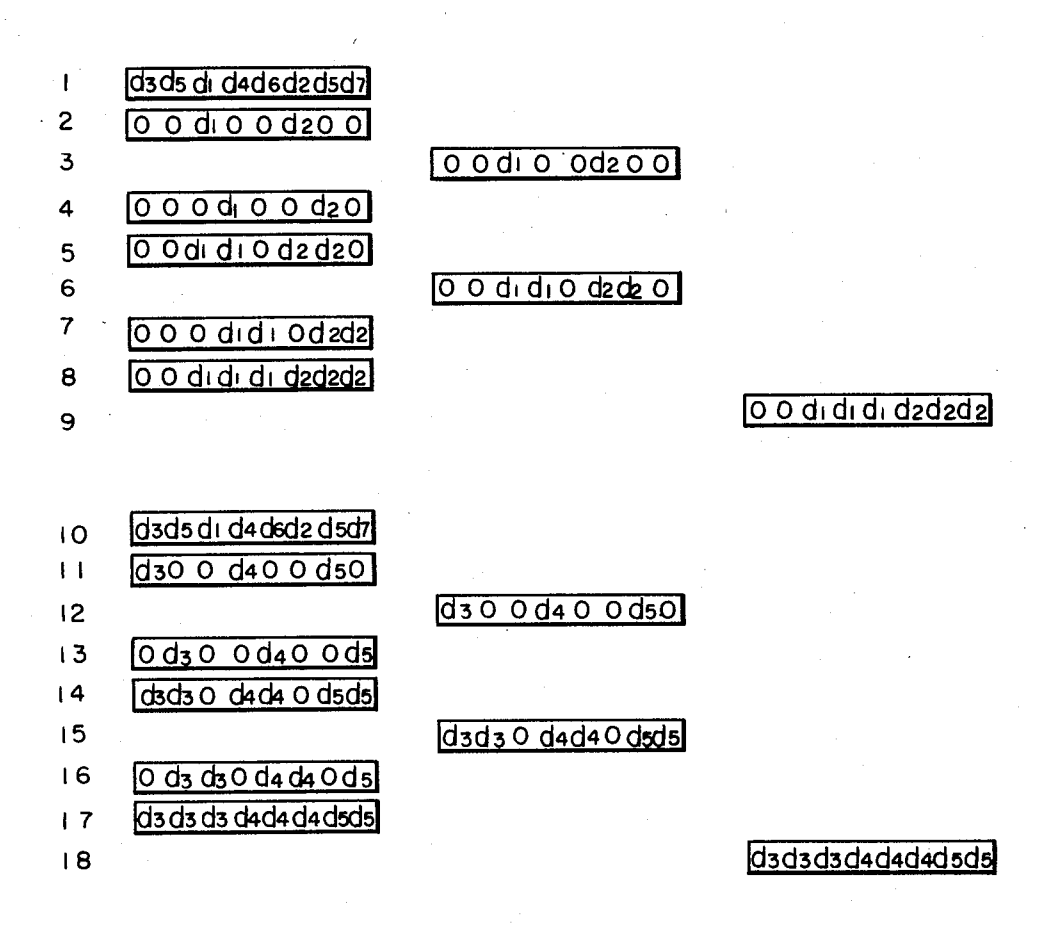
Figures 9C, 9D:
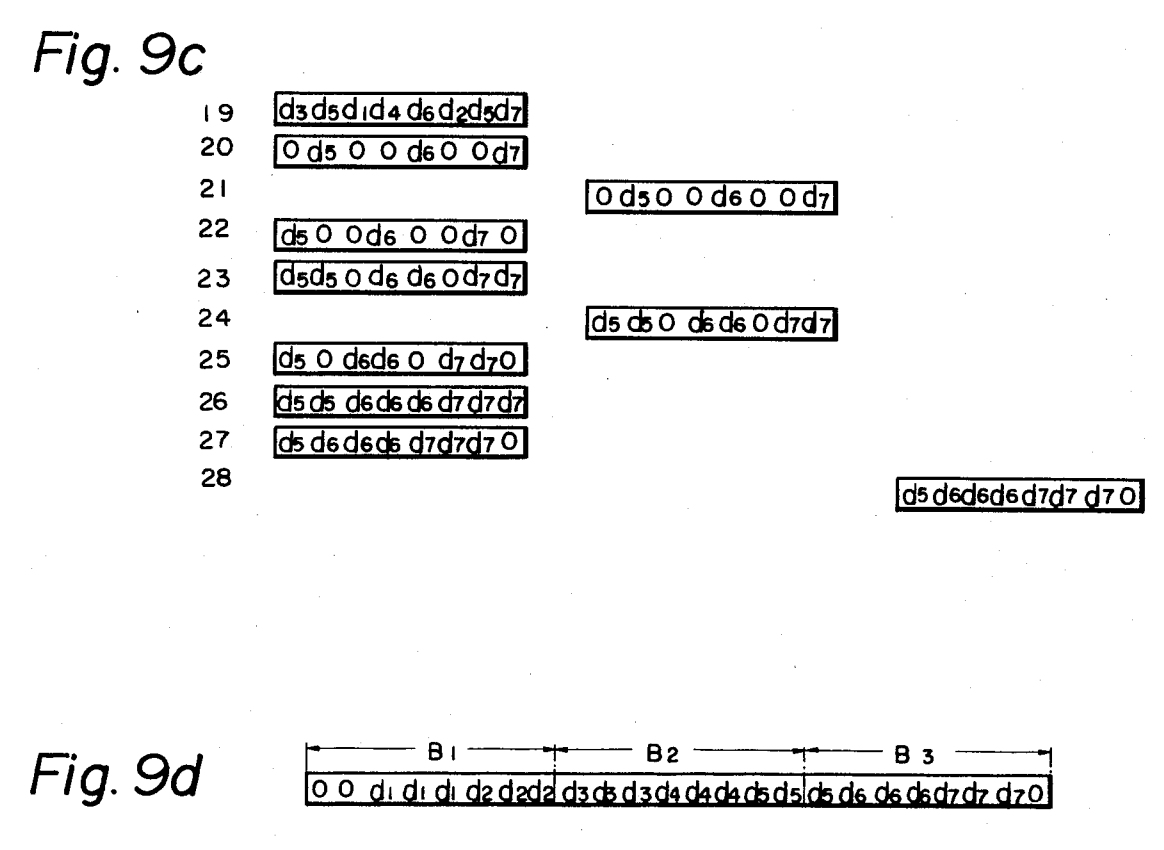

By the above program steps, one bit of picture element data $d_5$ and three bits each of picture element data $d_6$ and $d_7$ are stored in the address $B_3$ of the random access memory RAM 44 as shown in FIG. 9(c).

FIG. 9(d) indicates the picture element data $d_1$–$d_7$ stored in the addresses $B_1$–$B_3$ in the three times enlarged form by the series of program steps (1)–(28). When these data $d_1$–$d_7$ are fed to the printer 47 bit by bit through the printer interface 51, the printer 47 will record the character in its horizontally three times enlarged version. It will be needless to mention that, though the use of 8-bit registers A and B has made the number of program steps somewhat large in the case of three times enlargement of picture element data, the program can be simplified if use is made of registers having a larger capacity.

It will be noted in FIG. 8 that the column $a_5$ of picture element data is included twice. This is necessary since, as illustrated in FIG. 9d, the three times enlarged picture element $d_5$ spans RAM addresses $B_2$ and $B_3$. More specifically, two $d_5$ bits are stored in RAM address $B_2$ and one $d_5$ bit is stored in RAM address $B_3$. Thus, the bit $d_5$ must be used once in the process sequence of FIG. 9b to synthesize the data word in RAM address $B_2$ and again in the process sequence of FIG. 9c to synthesize the data word in RAM address $B_3$. It is further worthy of note that in FIG. 8 each column $d_1$ to $d_7$ is spaced from each consecutively higher or lower numbered column by two column widths.

In summary, a character generation system according to the present invention stores in a read only memory character patterns to be generated, feeds them to a microprocessor sequentially line by line, and reproduces them after magnifying them to predetermined numbers of bits. This promotes easy and simple generation of character patterns without resort to any special hardware for character pattern generation.

Additionally, where the present invention is applied to a facsimile device comprising a microcomputer, it can generate desired character patterns utilizing the microcomputer and thereby renders the facsimile device quite compact in design.

Figure 10:
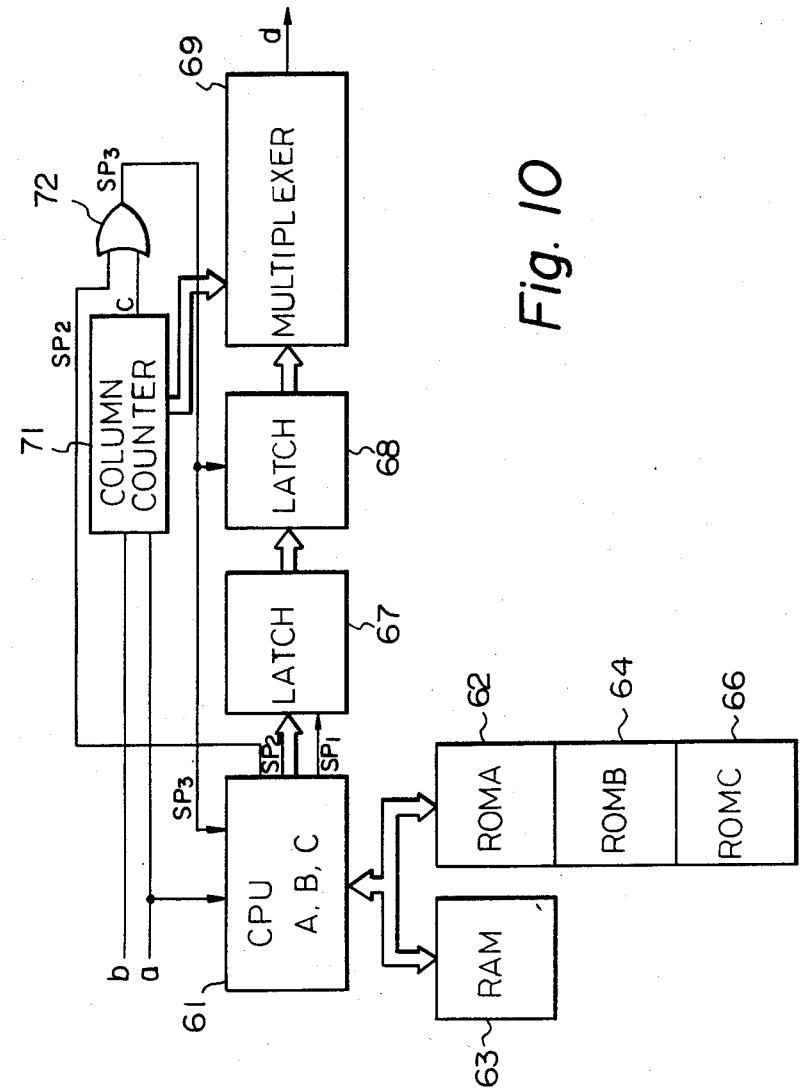
FIG. 10 is a block diagram of a character video signal generation system according to the present invention.

Referring to FIG. 10, another character video signal generation system according to the present invention is shown to include a microprocessor CPU 61 which sequentially reads out commands from a read only memory ROMA 62 and carries them out. Connected with the bus line of the microprocessor 61 are a random access memory RAM 63 and read only memories ROMB 64 and ROMC 66.

It will be apparent that the illustrated three read only memories ROMA 62, 64 and 66 are not restrictive in any way but may be replaced by one or two read only memories.

The read only memory ROMB 64 has stored therein picture element patterns sequentially line by line in its addresses which are read out in accordance with the content (A) of a register A of the microprocessor CPU 61 as will be described in detail.

Each address of the read only memory ROMB 64 consists of 16 bits on which 7 lower bits A0–A6 indicate a character code, 4 intermediate bits A7–A10 a line number and 5 upper bits A11–A15 a block number.

According to the illustrated embodiment, 128 characters are stored as character patterns. The character patterns and character codes are related as shown in FIG. 11.

Figure 11:
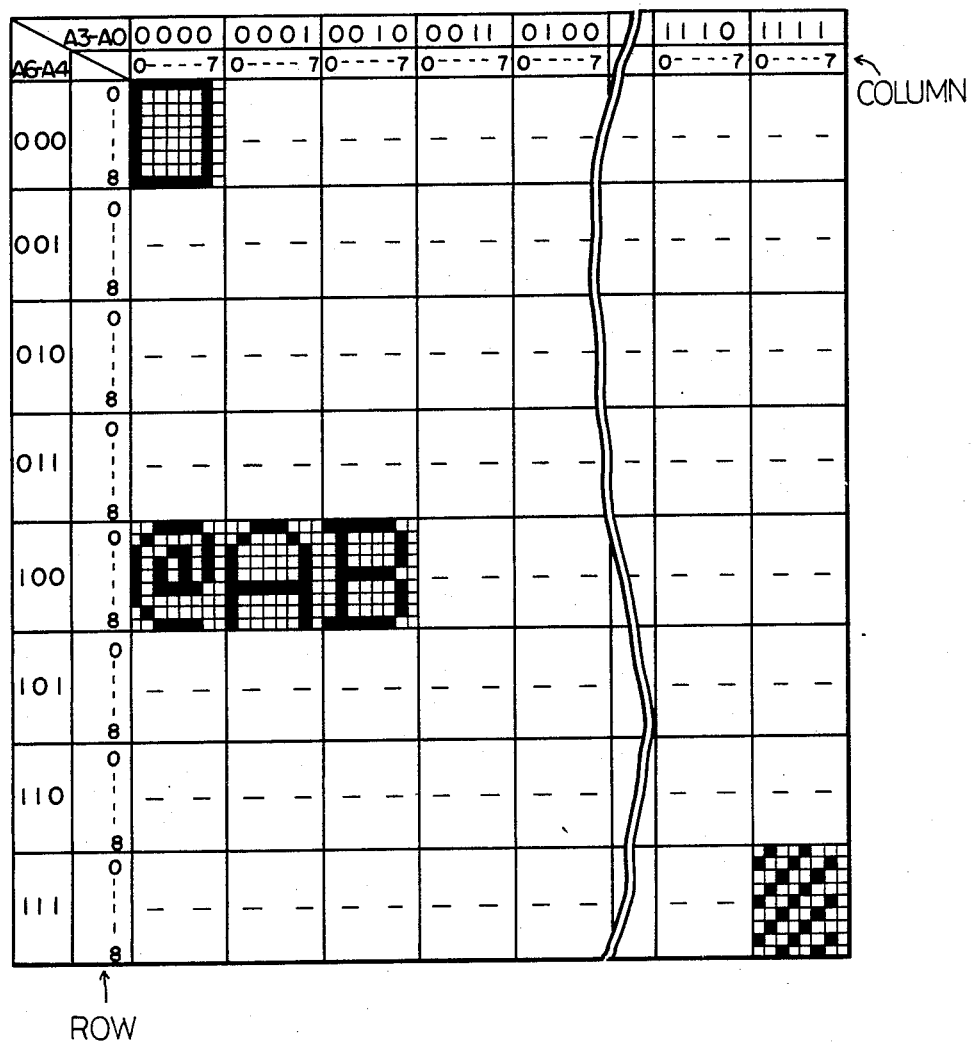
FIG. 11 shows exemplary picture element patterns obtainable with the system of FIG. 10.

Concerning the character codes A0–A6, it will be seen from FIG. 11 that character "A" is represented by "1000001" and the character "B" by "1000010".

Also, one character in picture element pattern form according to this embodiment has 8 columns (columns 0–7) and 9 lines (lines 0–8), i.e. 8×9 bits.

Therefore, the line numbers A7–A10 can be "0000" to "1000" in correspondence with lines 0–8.

"100000" is allotted as the block numbers A11–A15 to represent the read only memory ROMB 4.

Naturally, the above-mentioned codes are only for illustrative purpose and may be substituted by any other codes.

With such codes allotted to its addresses, the read only memory ROMB 64 successively stores the character patterns of FIG. 11 on a line-by-line basis in correspondence with the addresses as shown in the memory map of FIG. 12.

For example, the picture element data of line "0" of the character "A" which is "00111000" are stored in the address indicated by "1000000001000001". The picture element data "01000100" of line "1" of the character "A" are stored in the address indicated by "1000000011000001".

Figure 13:
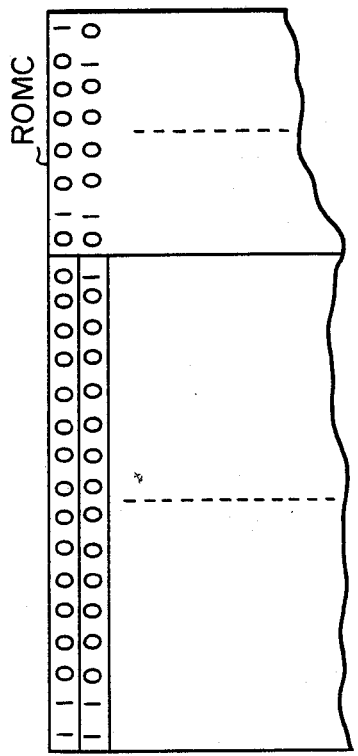
FIG. 13 shows the internal condition of a memory for storing codes of characters to be generated.

Meanwhile, the read only memory ROMC 66 stores the codes of character patterns desired to be generated in succession in its addresses which will be designated by the content (B) of a register B of the microprocessor CPU 61.

Where the characters "A" and "B" are desired to occur in the order named for example, the code "01000001" will be stored in the address "1100000000000000" and code "01000010" in the address "1100000000000001" as shown in FIG. 13 with reference to the memory map of FIG. 11.

The microprocessor CPU 61 has therein the registers A, B and C and a computing register. Adapted to designate picture element data in the read only memory ROMB 64, the register A has its content increased by "128" to increment the line number every time a vertical scan clock pulse a for interrupt operation is applied to the microprocessor CPU 61. The register B adapted to designate a character code in the read only memory ROMC 66 serves as a character counter whose count is incremented every time a strobe pulse SP3 interrupts the microprocessor CPU 61.

Thus, the microprocessor CPU 61 is so designed as to be selectively interrupted by vertical scan clock pulses a generated by a system controller (not shown) and strobe pulses SP3 which will be described.

When interrupted by a clock pulse a, the microprocessor CPU 61 first loads the leading address of the read only memory ROMC 66 in the register B and then adds "128" to the register A to clear the lower 7 bits thereof.

Thereupon, the content of the memory address designated by the register B, that is, the character code stored in the read only memory ROMC 66, is added to the register A to prepare an address of picture element data. Then, predetermined data is fed from the location of the ROMB 64 designated by the register A to a latch circuit 67 together with a strobe pulse SP1. The microprocessor 61 produces a strobe pulse SP2 and thereafter carries out an interrupt process (1) for incrementing the content of the register B.

When interrupted by a strobe pulse SP3, the microprocessor CPU 61 first clears the lower 7 bits of the register A and then adds a character code picked up from the location of the read only memory ROMC 66 designated by the register B to the register A thereby preparing an address of picture element data.

Thereafter, predetermined data is fed from the location of the read only memory ROMB 64 designated by the register A to the latch circuit 67 together with a strobe pulse SP1. This is followed by an interrupt process (2) for incrementing the content of the register B.

The latch circuit 67 serves to latch data applied thereto from the microprocessor CPU 61 with the accompanied strobe pulse SP1 and deliver it to a second latch circuit 68.

The second latch circuit 68 latches the input data with a strobe pulse SP3 and feeds it to a multiplexer 69.

The data at the multiplexer 69 is produced thereby as a bit-by-bit video signal d in accordance with the count of a column counter 71.

The column counter 71 is a ring counter. It is reset by a vertical scan slock pulse a, counts horizontal scan clock pulses b, produces a carry C when its count reaches "7", and goes back to "0" in response to the next horizontal scan clock pulse.

Figure 14:
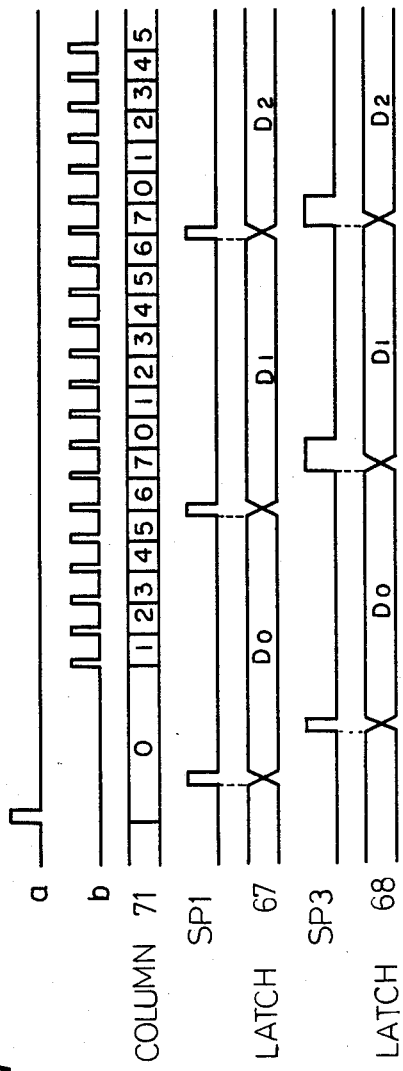
FIG. 14 is a timing chart showing the operation of the FIG. 10 system.

The operation of the system will be described in greater detail with reference to the timing chart of FIG. 14.

In the initial state, the register A inside the microprocessor 61 is loaded with "0111111110000000". The read only memory ROMB 64 has stored therein 128 characters and symbols as lines of decomposed picture elements. The read only memory ROMC 66 has stored in its leading address the code "0100001" of the initial character "A", code "01000010" of the second character "B" in the next address, and in the same way codes of the other characters in the other addresses.

As the scan of a document is started, a horizontal scan pulse a appears at the leading end of the line and then horizontal scan clock pulses b appear from the facsimile control section in synchronism with the scanning operation of the scanner.

For instance, where a document of format A (A4, A5, etc.) according to JIS (Japanese Industrial Standard) is scanned, a vertical scan clock pulse a appears at every 7.7/8 mm of vertical scan while 1728 horizontal scan clock pulses b appear at every ⅛ mm of horizontal scan.

The horizontal scan clock pulse a reset the column counter 71 and interrupt the microprocessor CPU 61.

Then executing the process (1), the microprocessor 61 loads the leading address "1100000000000000" of the read only memory ROMC 66 in the register B.

Next, the microprocessor 61 adds "128" to the register B to make it "1000000000000000" and clears the lower 7 bits. The character code "01000001" of the character "A" stored in the address of the ROMC 66 designated by the register B is added to the register A for thereby preparing the address "1000000001000001" of the ROMB 64 which has stored the picture information of line "0" of the character "A". Then the data "00111000" in the read only memory ROMB 64 designated by the register A is applied to the latch circuit 67 together with a strobe pulse SP1. Subsequently, the microprocessor 61 after producing a strobe pulse SP2 increments the content of the register B to "1100000000000001" and thus completes the process (1).

The latch circuit 67 latches the data "00111000" with the accompanied strobe pulse SP1 and feeds it to the second latch circuit 68.

The strobe pulse SP2 is passed through an OR gate 72 to the latch circuit 68 and microprocessor CPU 61 as a strobe pulse SP3.

The latch circuit 68 latches the data "00111000" with the strobe pulse SP3 and delivers it to the multiplexer 69.

After the process (1) caused by the clock pulse a, the microprocessor CPU 61 carries out the process (2) in response to the strobe pulse SP3.

In the process (2), the microprocessor 61 clears the lower 7 bits of the register A and sets "1000000000000000" therein and then prepares the address "1000000001000010" of the read only memory ROMB 64 storing the data of line "0" of the character "B" by adding to the register A the character code "01000010" of the next character "B" stored in the address "1100000000000001" of the read only memory ROMC 66 designated by the register B.

Thereafter, the microprocessor 61 supplies the latch circuit 67 with the picture data $D_1$ "11111100" stored in the read only memory ROMB 64 designated by the register A together with a strobe pulse SP1.

Then the microprocessor 61 increments the content of the register B to "1100000000000010" and completes the process (2).

Thus, the latch circuit 67 latches the data $D_1$ with the input strobe pulse SP1.

In this way, the latch circuit 67 latches the data $D_0$ of the initial character "A" whereas the latch circuit 68 latches the data $D_1$ of the next character "B".

In the meantime, the facsimile control unit (not shown) supplies the column counter 71 with horizontal scan clock pulses b in synchronism with the operation of the scanner.

Counting the clock pulses b, the column counter 71 delivers its count or column designating signal to the multiplexer 69.

Based on the column designating input, the multiplexer 69 produces the picture data of the second line stored therein bit by bit in succession. As a result, video signals of the 0 line of the character "A" appear sequentially from the multiplexer 69 in synchronism with the horizontal scan clock pulses b.

When the count of the column counter 71 reaches "7", a carry C appears from the column counter 71, and is changed into a strobe pulse SP3 by the OR gate 72.

Fed to the latch circuit 68, this strobe pulse SP3 latches the next character data applied to the latch circuit 68 while interrupting the microprocessor CPU 61. Then the microprocessor 61 again performs the process (2) in which it produces data $D_2$ and a strobe pulse SP1 and makes the content of the register B "1100000000000011".

Consequently, the multiplexer 69 produces video signals d bit by bit in synchronism with horizontal scan clock pulses b as already described.

The above procedure is repeated thereafter. Every time the column counter 71 produces a carry C, data are sequentially shifted from the latch circuit 67 to the latch circuit 68 while data are successively read out from the read only memory ROMB 64 and latched in the latch circuit 67. Thus, video signals d of line "0" are produced successively from the multiplexer 69.

As the generation of video signals of line "0" is completed, the system starts its operation on line "1". At this instant, a vertical scan clock pulse a appears.

In response to this clock pulse a, the microprocessor CPU 61 performs the process (1) as described above in which it re-sets the register B to the leading address "1100000000000000" of the read only memory ROMC 66 and adds "128" to the register A so that "1000000010000000" is produced with the lower 7 bits of the register A cleared. The content of the address designated by the register B, that is, the character code "01000001" of the character "A" is picked up from the read only memory ROMC 66 and added to the register A for thereby preparing the address "1000000011000001" of the data of line "1" of the character "A" inside the read only memory ROMB 64. Then the data "01000100" is picked up and fed to the latch circuit 67.

This is followed by the process (2) caused by a strobe pulse SP3 as discussed above. Data on line "1" stored in the read only memory ROMC 66 are produced in succession. Therefore, the multiplexer 69 this time produces video signals d of the first line in series.

The same procedure is repeated thereafter until the multiplexer 69 sequentially produces 9 lines or one full line of characters as line-by-line video signals d.

Figure 15:
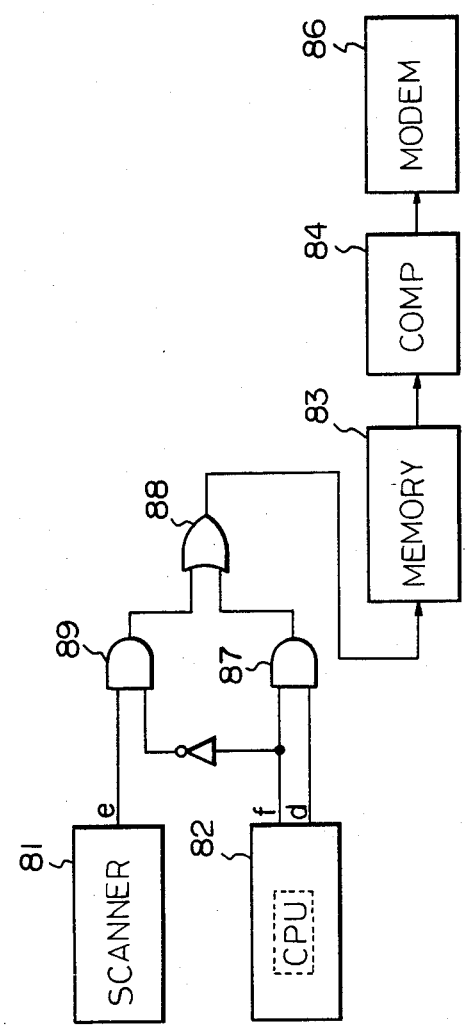
FIG. 15 is a block diagram of an addresser's facsimile transceiver to which the present invention may be applied by way of example.

FIG. 15 shows a facsimile transceiver at an addresser's station designed for the transmission of the thus produced character video signals to an addressee's station by adding them to image information provided by the scanner.

More specifically, FIG. 15 is a schematic illustration of a facsimile transceiver of the type which selectively transmits video signals e picked up through the scanner and the character video signals d. The facsimile transceiver comprises a scanner 81, a character video signal generator 82, a buffer memory 83, a data compression unit 84 and a modem 86.

At the instant scanning of a document has been started, the microprocessor CPU 61 produces a video signal selection signal f which then opens an AND gate 87 to pass the video signals d to the buffer memory 83 via the AND gate 87 and an OR gate 88. The signals d are run-length coded by the data compression unit 84 and then transmitted to the addressee's station through the modem 86.

As all of the video signals d indicating additional information, that is, 11 lines of video signals d are produced by the character video signal generator 82, a signal f from the microprocessor 61 now opens an AND gate 89 so that video signals e from the scanner 81 are fed through the OR gate 88 to the modem 86.

Consequently, a paper sheet at the addressee's station is recorded first with the additional data and then the image data.

It will be noted that the multiplexer 69 may comprise a shift register which shifts out the parallel out of the latch circuit 68 bit by bit in series in accordance with the column counter 71 output.

It will also be noted that the present invention is not limited to use at an addresser's facsimile transceiver but may naturally be applied to an addressee's transceiver to add necessary information thereat.

In summary, a character video signal generation system according to the present invention employs a microprocessor to sequentially pick up desired additional information stored as picture element patterns in a memory. Therefore, the system can generate each character video signal bit with a very simple construction.

Various modifications will become possible for those skilled in the art after receiving the teachings of the present disclosure without departing from tbe scope thereof.

What is claimed is:

1. A video pattern generation apparatus comprising:
a read-only memory means for storing a plurality of characters which are decomposed on a bit-by-bit basis in the horizontal and vertical directions; and
microprocessor means for sequentially reading the character bits out of the memory means and expanding the characters to a predetermined extent for transmission.

2. A video pattern generation apparatus comprising:
a read-only memory means for storing a plurality of characters which are decomposed on a bit-by-bit basis in the horizontal and vertical directions; and
microprocessor means for sequentially reading the character bits out of said read-only memory means and expanding the characters to a predetermined extent for transmission;
the character bits being divided into n blocks each consisting of a predetermined number of bits which are stored in said read-only memory means in an alternating arrangement whereby bits in respective positions in the blocks follow each other in consecutive order, the microprocessor means being constructed to compute the logical OR function of said predetermined number of respective character bits of each block and data bits produced by shifting respective character bits by one bit position $n-1$ times for producing horizontal character lines enlarged by n.

3. A video pattern generation apparatus comprising:
memory means for storing data bits corresponding to scan lines of characters;
computing means for reading the data bits out of the memory means; and
transmission means for transmitting each consecutive data bit a predetermined number of times;
the data bits of each scan line being divided into a number of groups which are stored in the memory means in an alternating manner, said number being equal to said predetermined number, the computing means comprising register means and operation means for separating the groups of data bits by means of logical product operations, generating duplicate data bits by means of logical sum and shifting operations and storing the data bits and duplicate data bits in the register means in consecutive order such that said predetermined number of each data bit is followed by said predetermined number of the next consecutive data bit.

4. A video pattern generation apparatus comprising:
memory means for storing data bits corresponding to scan lines of characters;
computing means for reading the data bits out of the memory means; and
transmission means for transmitting each consecutive data bit a predetermined number of times;
the memory means comprising first storage means for storing the data bits, second storage means for storing character codes, column counter means for counting horizontal scan clock pulses, the computing means reading data bits from the first storage means in response to carry pulses from the column counter means and third storage means for storing the data bits read by the computing means, the transmission means transmitting the data bits in synchronism with the horizontal scan clock pulses.

5. An apparatus as in claim 4, in which the third storage means comprises first latch means for latching data bits read by the computing means and second latch means for latching data bits from the first latch means in response to the carry pulses.

* * * * *